US006299093B1

(12) United States Patent
Harte et al.

(10) Patent No.: US 6,299,093 B1
(45) Date of Patent: Oct. 9, 2001

(54) SENSOR FOR A SEAT BELT RETRACTOR (75) Inventors: Joseph Patrick Harte, Maryport; Kenneth Williamson, Carlisle; Steve Marshall, Low Seaton, all of (GB); Gerrit Kooy, Kaufering; Peter Jungbauer, Unterbernbach, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/515,769

(22) Filed: Mar. 1, 2000

(30) Foreign Application Priority Data

Apr. 21, 1999 (GB) ................................................ 9908978

(51) Int. Cl.⁷ ............................ B60R 22/40; B65H 70/48
(52) U.S. Cl. .................................. 242/384.4; 242/384.6; 280/806; 297/478
(58) Field of Search .......................... 242/384, 384.4, 242/384.5, 384.6; 280/806; 297/478

(56) References Cited

U.S. PATENT DOCUMENTS

| 3,834,646 | * | 9/1974 | Heath | ............................ 242/107.7 |
| 3,990,651 | * | 11/1976 | Romanzi et al. | ................. 242/107.4 |
| 4,129,267 | * | 12/1978 | Degras et al. | .................... 242/107.4 |
| 4,688,825 |   | 8/1987 | Arbogast et al. | .................... 280/803 |
| 4,760,975 | * | 8/1988 | Doty | .................................. 242/107.4 |
| 5,622,383 | * | 4/1997 | Kielwein et al. | .................... 280/806 |

FOREIGN PATENT DOCUMENTS

| 1528184 | 10/1978 | (GB) . |
| 2032252 | 5/1980 | (GB) . |
| 2328184 | 2/1999 | (GB) . |

* cited by examiner

Primary Examiner—Donald P. Walsh
Assistant Examiner—David A Jones
(74) Attorney, Agent, or Firm—Lonnie Drayer (57) ABSTRACT A vehicle seat belt retractor has a frame, a spool rotatably mounted to the frame and a spool locking device for locking the spool against rotation. The spool locking device includes actuating means for actuating the locking device. The actuating means is a support carrying a mass and a pawl, the mass being arranged to move from an initial position to an actuating position to actuate the pawl into engagement with the ratchet on the spool. The actuating means is an adjustment mechanism for adjusting the distance between the pawl and the ratchet. The adjustment mechanism may adjust the support relative to a housing, and adjust the tip of the pawl relative to the pawl body or a deformable pawl tip.

6 Claims, 8 Drawing Sheets

SENSOR FOR A SEAT BELT RETRACTOR

FIELD OF THE INVENTION

The present invention relates to an adjustable vehicle sensor for a retractor of a vehicle seat belt.

BACKGROUND OF THE INVENTION

A retractor for a vehicle seat belt contains a vehicle sensor, which responds to changes in the vehicle acceleration or deceleration occurring in a vehicle crash. The vehicle sensor is one of two sensor inertial mechanisms within the retractor; the other sensor means detects pay out of the webbing from the retractor due to the movement of a vehicle occupant when the vehicle decreases or increases in speed. The second mechanism is often called a webbing sensor.

The vehicle sensor comprises an inertial mass either in the form of a ball or a hollow shaped tube acting on a pin or a mass with a relatively high center of gravity located above a narrow base. Movement of the mass acts on a vehicle sensor lever positioned in close proximity to the mass to move a toothed portion of the vehicle sensor lever into engagement with teeth on a spool or a ratchet thus initiating the locking of the retractor spool and preventing further pay out of the webbing.

A typical retractor, including the vehicle sensor, is formed by many cooperating components. One of the problems associated with prior art retractors is that each component can vary in size due to environmental changes such as changes in temperature during the component manufacturing process. For example, components vary in dimensions due to multi cavity tools where more than one component is molded in sequence or at the same time. Also if large volumes of components are manufactured the molding tool may deteriorate or wear causing variation in component sizes. The variation in sizes creates variability in the relationship between each component. This is particularly undesirable in the vehicle sensor as the spacing between the spool teeth and the vehicle sensor locking teeth requires precision. The variation in the gap between the spool or ratchet teeth and the vehicle sensor locking tooth gives poor repeatability of the vehicle sensor's performance and controls the retractors locking. The space between the spool or ratchet teeth and the vehicle sensor locking tooth is called the "tip gap".

If the gap between the vehicle sensor lever and the spool teeth is too narrow the vehicle sensor lever may engage with the spool teeth and lock the retractor in a non-emergency situation. This can create discomfort for the occupant with the seat belt "jamming". In the case of an inertial mass in the shape of a ball, the ball rests on a socket and is free to move upon a change in position of the vehicle and retractor. The ball may cooperate directly or indirectly with a vehicle sensor lever. Alternatively the vehicle sensor may contain a cap or lid which sits directly over the inertial mass, which cooperates with the vehicle sensor lever. Upon displacement of the inertial mass the vehicle sensor lever is lifted either via the vehicle sensor inertia cap, directly by the mass or by a system of levers. The vehicle sensor lever is pushed upwards and engages with the teeth on the retractor spool thereby locking the retractor spool and preventing further rotation.

If the various retractor components have changed in size, thus creating a varying "tip gap", and if the vehicle is positioned at an angle the vehicle occupant may not be able to remove the webbing from the retractor rendering the seat belt unusable or creating a very sensitive belt which acknowledges and locks the retractor under non-emergency situations.

It is required that all retractors lock within specific pay out of webbing under certain vehicle acceleration and declaration conditions. With wide variations in component sizes the retractor locking times will vary and therefore different amounts of webbing will be released from the retractor. Such variations result in poor performance and efficiency of the seat belt. The higher the variation in the vehicle sensor performance, the higher the likelihood of experiencing high pay out of webbing which will not provide the most effective protection to the vehicle occupant.

SUMMARY OF THE INVENTION

The present invention is a seat belt retractor vehicle sensor, which can be adjustable in height relative to the position of the retractor spool teeth upon manufacture of the retractor. The present invention provides a seat belt retractor vehicle sensor which can be adjustable in height by repositioning the vehicle sensor housing upon installation of the vehicle sensor on the retractor frame, or by altering the vehicle sensor lever arm to modify the aperture between the spool teeth and the vehicle sensor lever.

DETAILED DESCRIPTION OF THE INVENTION

Figure 1:
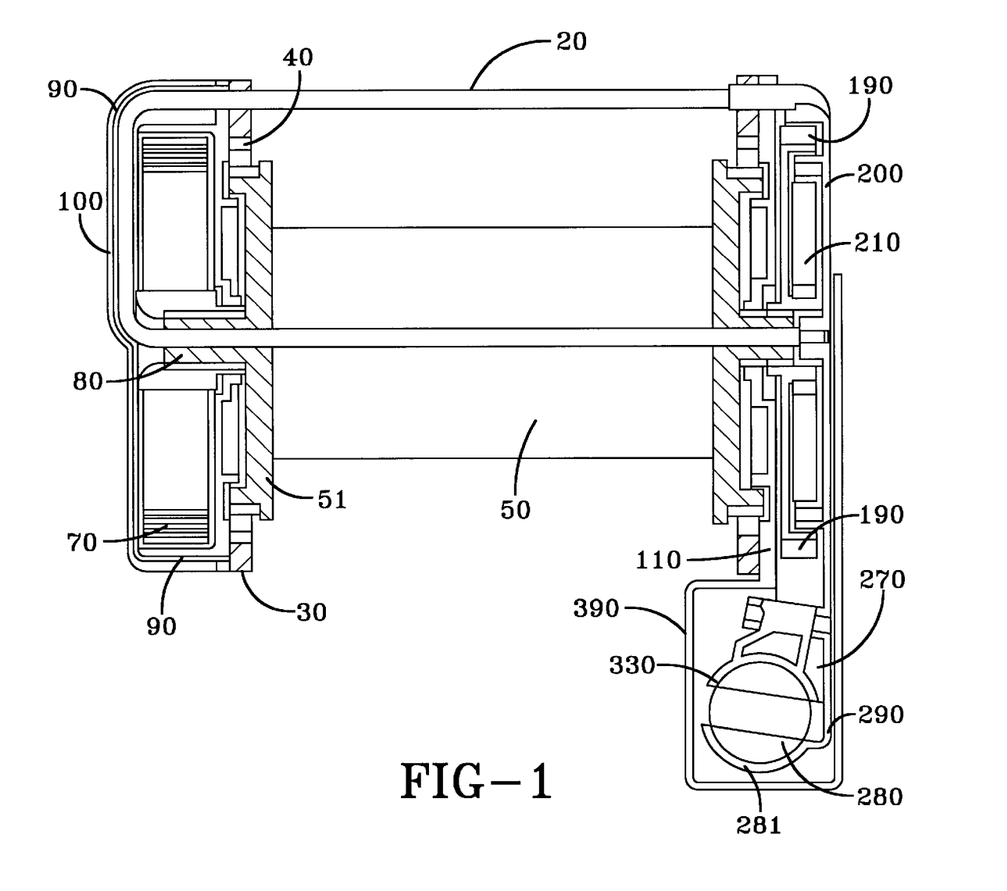
FIG. 1 is an elevation cross section of a seat belt retractor.

In FIG. 1 a seat belt retractor 20 with a ball type vehicle sensor 270 is illustrated. The retractor spool 50 rotates in the frame 30. The spool 50 is biased in the webbing retraction direction by the retraction spring 70, which is held in a spring cup 100 and is connected to the spool 50 by a pinion 80. The spring cup 100 and spring assembly is contained in a spring end cap 90, that is attached directly to the retractor frame 30. The spool 50 is used as a storage facility for the webbing (not shown) which is withdrawn from the retractor when the seat belt is placed securely around the vehicle occupant.

On the opposite side to the retractor spring sits the retractor locking and sensing devices 200, 270. These include the web sensor mechanism 200, the main locking pawl (not shown) and the vehicle sensor 270. The vehicle sensor 270 comprises an inertial ball mass 280 and an inner vehicle sensor housing or subassembly 290 as well as an outer vehicle sensor housing 390. The inertial mass 280 is held in a socket 281 and is capable of movement. Any change in position of the inertial mass 280 repositions the vehicle sensor cap 330, which, in turn repositions the vehicle sensor lever.

Figure 2:
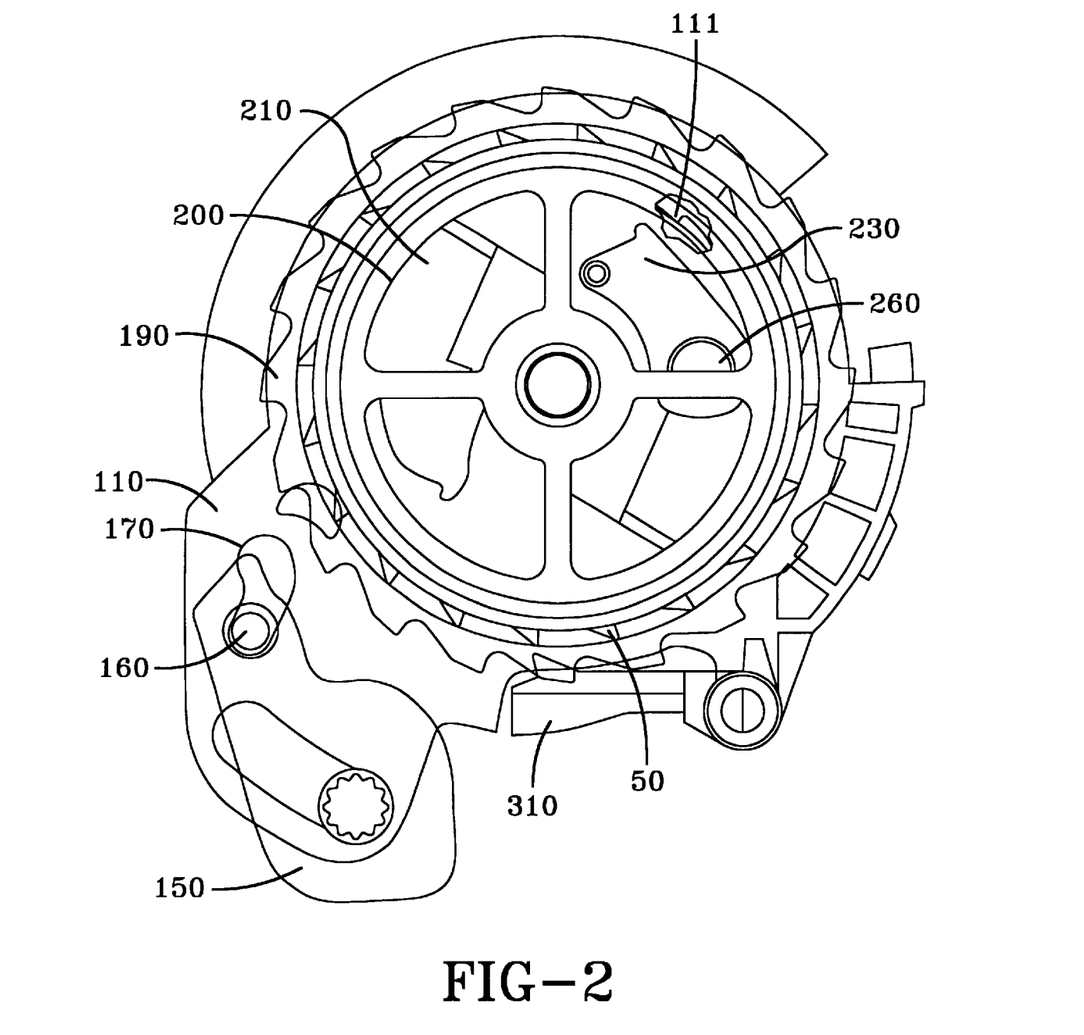
FIG. 2 is a side elevation cross section of the seat belt retractor of FIG. 1 showing the webbing sensor mechanism and the main locking pawl and multifunction piece.

FIG. 2 depicts the web sensor locking device 200 and the main locking pawl 150. Upon an increase in webbing pay out the spool 50 rotates. If the acceleration of this pay out exceeds between 0.8 g to 2 g the inertial mass 210 cannot rotate with the spool and pushes the web sensor pawl 230 in a clockwise direction around the web sensor pivot pin 260 and locks in the teeth 111 on the multifunction piece 110. Once the web sensor pawl 230 and the multifunction pieces 110 are locked together the continued rotation of the spool forces the multifunction piece to rotate and moves the main locking pawl 150 into engagement with the spool teeth 190 via the locking pawl pin 160 and the slot or cam surface 170 within the multifunctional piece.

Figure 3:
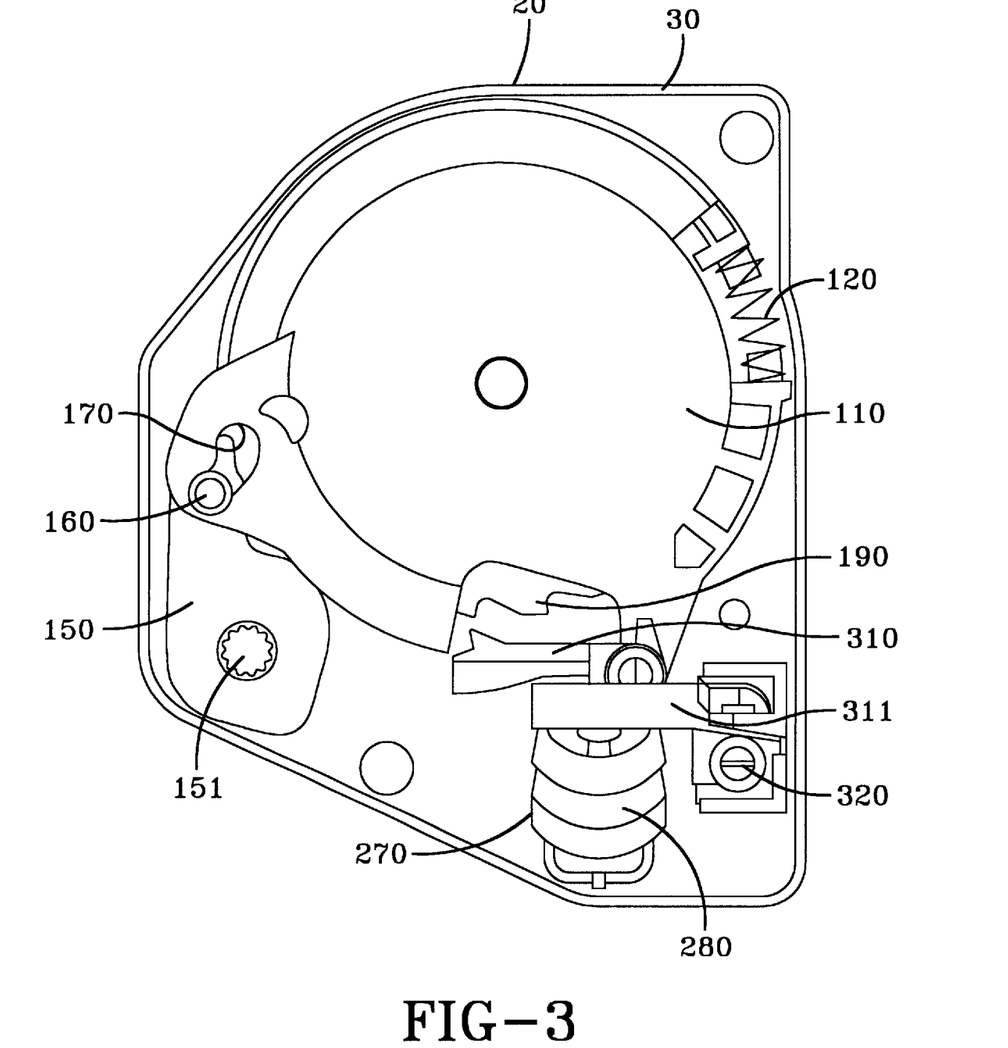
FIG. 3 is a side elevation cross section of the seat belt retractor of FIG. 1 showing the main locking pawl, multifunction piece and the vehicle sensor mechanism.

FIG. 3 is a cross sectional view of the retractor 20 with the multifunctional piece 110 covering the web sensor mechanism. The connection between the main locking pawl 150 and the multifunctional piece 110 is shown. The locking pawl 150 has a pin 160, which acts with a slot 170 in the multifunctional piece. Upon locking of the spool (not shown) the multifunctional piece rotates in an anti-clockwise direction rotating the pin 160 through the cam 170 about the locking pawl pivot point 151 thereby engaging the locking pawl 150 with the spool teeth 190. FIG. 3 also discloses the secondary sensing mechanism 270, the vehicle sensor. Upon a change in position of the vehicle the inertial mass 280 moves. This movement lifts the secondary vehicle sensor lever 311 around a pivot point 320 and lifts the primary sensor lever 310, which engages with the spool teeth 190. This locks the spool and prevents rotation.

Figure 4:
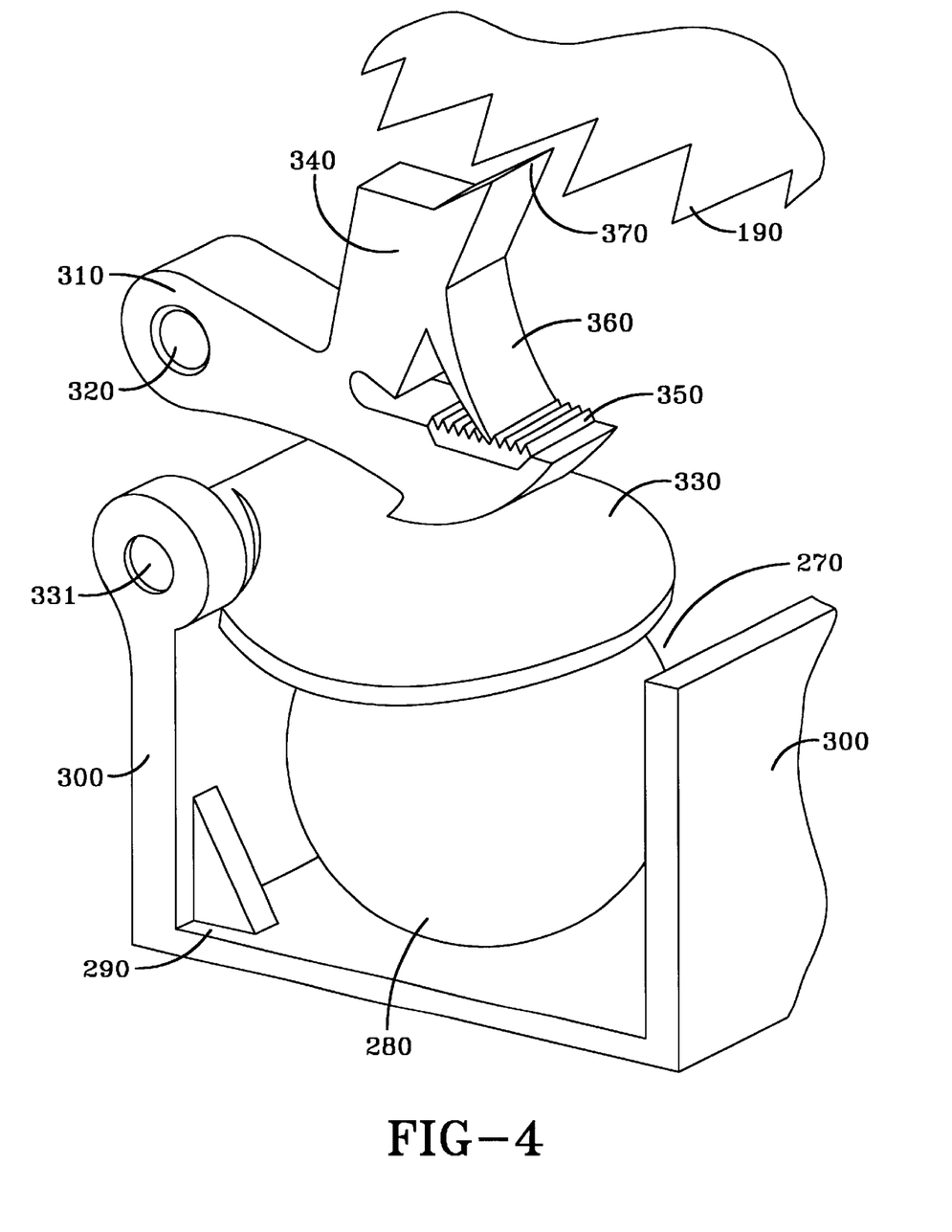
FIG. 4 is a perspective view of the vehicle sensor and one embodiment of the present invention with only part of the spool teeth illustrated.

FIG. 4 is a fragmentary perspective view of the first embodiment of the present invention. The vehicle sensor inertial mass 280 is held within the inner vehicle sensor housing 290 and is contained via the side walls 300. The vehicle sensor cap 330 rests over the mass and pivots about a hinge point 331. On normal operation of the retractor the vehicle sensor cap 330 cooperates with the vehicle sensor lever 310 but the lever does not engage the spool teeth 190, which are free to rotate. The distance between the spool teeth 190 and the vehicle sensor tooth 370 is predetermined by adjusting one leg 360 of the vehicle sensor lever 310 to maneuver the height of the vertically angular vehicle sensor lever leg 340 to the correct position in relation to the spool teeth 190.

The adjustable leg 360 of the vehicle sensor lever 310 can be positioned and secured permanently or temporarily by engaging the end of the leg 360 with the teeth 350 located on the surface of the vehicle sensor lever face closest to the adjustable leg and parallel to the spool teeth 190. The location of the teeth 350 can be arranged to provide operative spacing between the spool teeth 190 and the vehicle sensor lever locking tooth 370 so that the spacing between the two aforementioned components ensures engagement of the vehicle sensor lever locking tooth and the spool teeth at the most appropriate time and point to guarantee complete engagement and thereby secure locking of the retractor spool. Thus the tip gap is adjusted in relation to the position of the vehicle sensor adjustable leg 360 by engagement with the teeth 350.

Figure 5:
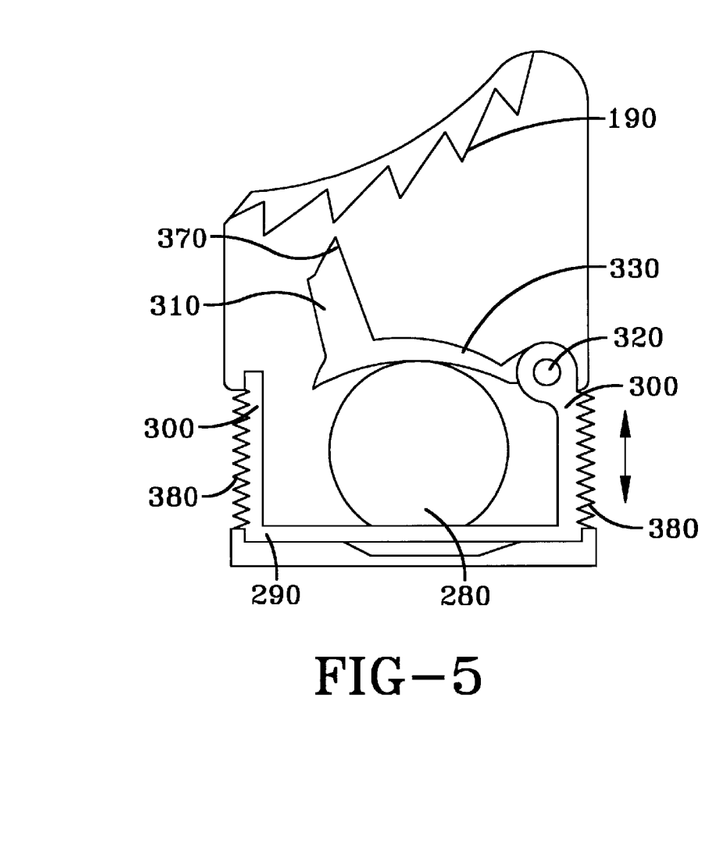
FIG. 5 is a cross sectional view of the vehicle sensor disclosing a further embodiment of the present invention.
Figure 6:
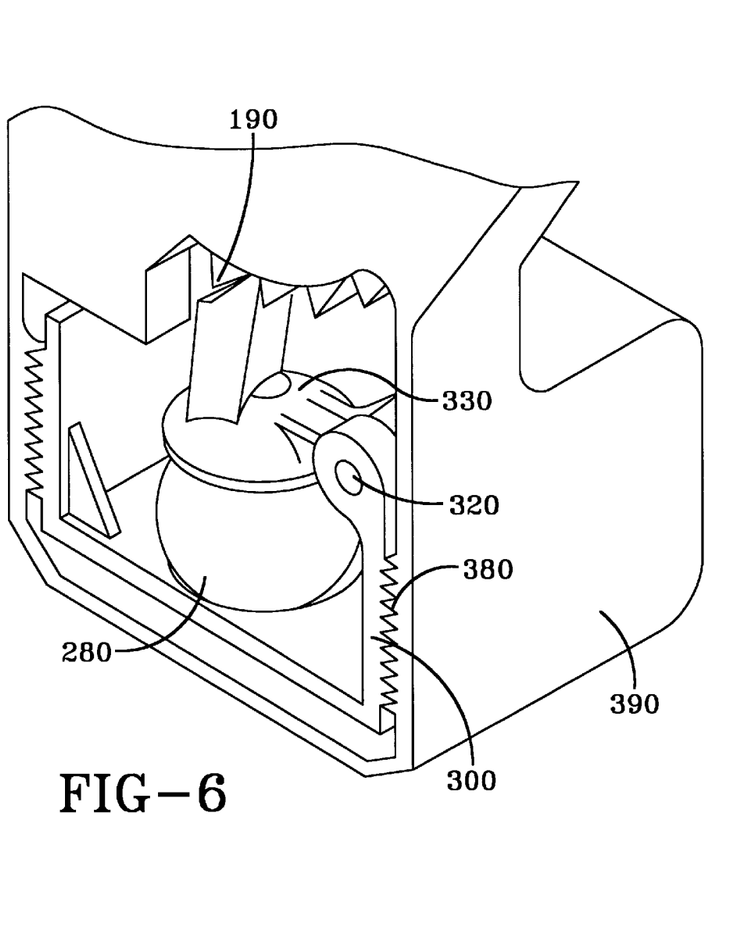
FIG. 6 is a perspective view, partially broken away, of the vehicle sensor and part of the outer vehicle sensor housing and spool teeth.

The distance between the spool teeth 190 and the vehicle sensor can further be controlled by adjusting the position of the inner vehicle sensor housing 300 in relation to the spool teeth 190. FIGS. 5 and 6 disclose such a method. The whole inner vehicle sensor housing 300 including the inertial mass 280 and vehicle sensor cap 330 are repositioned on the retractor frame (not shown) upon manufacture of the retractor via serrations 380 on the inner vehicle sensor housing walls 300. The vehicle sensor inner subassembly 290 can be placed in the outer housing 390 either by deforming the serrations 380 as they are pushed against the outer housing 390 or by using corresponding serration's on the outer housing allowing more specific positioning of the inner housing. The position of the inner vehicle sensor housing will thus reflect the distance between the spool teeth 190 and the primary vehicle sensor lever 310.

Thus the tip gap is adjusted in relation to the position of the inner vehicle sensor housing 300 to the outer vehicle sensor housing 390.

Figure 7:
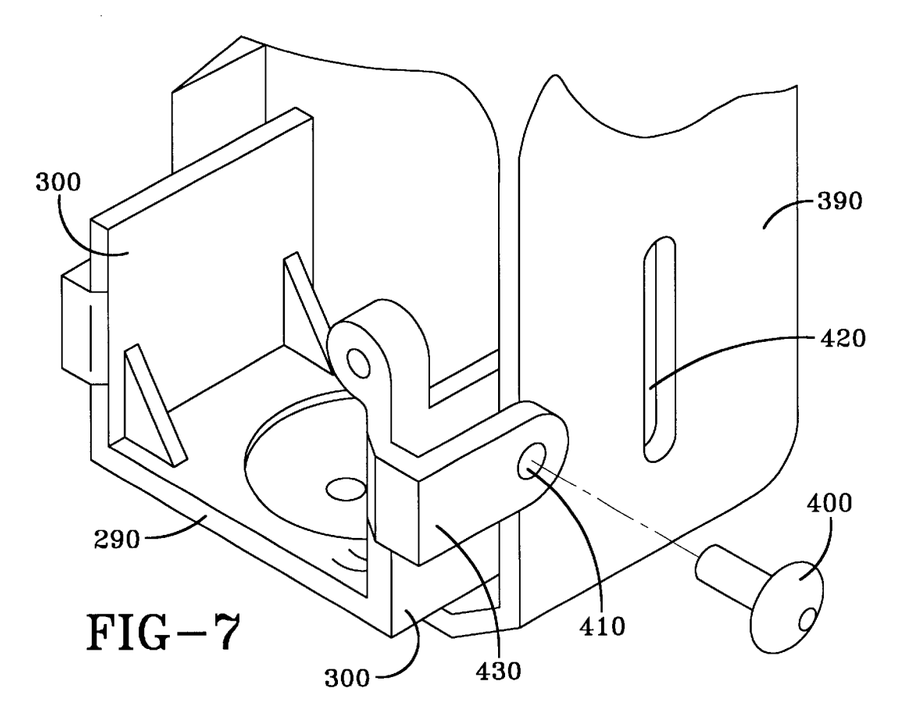
FIG. 7 is a fragmentary perspective view of the vehicle sensor inner and outer housing without the inertial mass or spool teeth.

FIG. 7 discloses a further method of adjusting the distance between the spool teeth and the vehicle sensor locking pawl by positioning the vehicle sensor inner housing 300 on the vehicle sensor outer housing 390. The inner vehicle sensor housing is manually or automatically positioned in the outer vehicle sensor housing and is secured in the correct position using rivets 400 which are placed through holes in an extending arm 430 connected to the vehicle sensor inner housing 300. The extending arms 430 surround the outer vehicle sensor housing wall 390. These outer vehicle sensor housing walls contain slots 420. The rivets can be secured by various means such as heat treatment or a non-return self-driving helix rivet.

Figure 8:
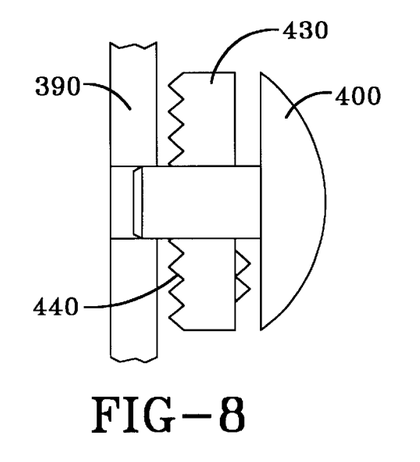
FIG. 8 is a fragmentary side elevation view of the invention disclosed in FIG. 7.
Figure 9:
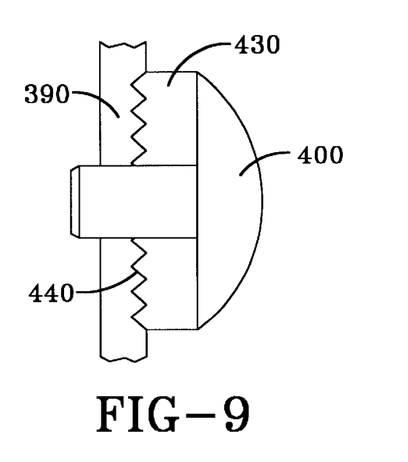
FIG. 9 Shows a second side view of the embodiment disclosed in FIG. 7.

FIGS. 8 and 9 show a variation of this embodiment. Serrations 440 on the inner wall of the arm 430 surrounding the outer vehicle sensor housing 390 are pressed against the inner vehicle sensor housing wall 300 when the rivets 400 are pressed through the holes 410 into the slots 420 in the outer vehicle sensor housing wall 390. The serrations plastically deform the outer vehicle sensor housing 390 thus holding the vehicle sensor inner housing in its correct position.

Figure 10:
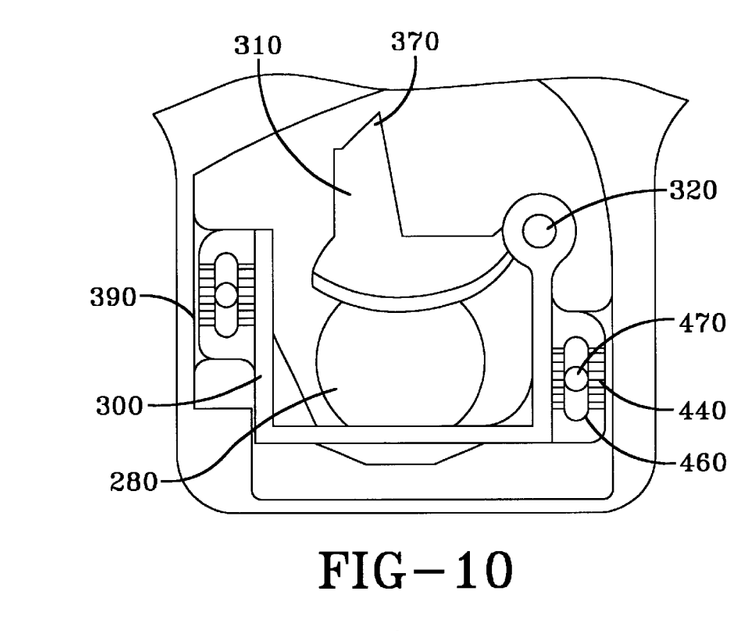
FIG. 10 is a fragmentary cross sectional view of a vehicle sensor including the inner and outer housings.
Figure 11:
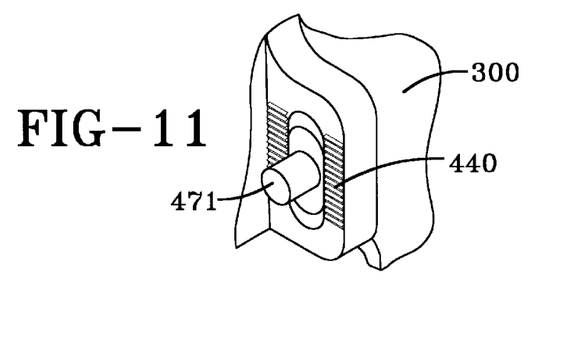
FIG. 11 is a perspective enlarged view of the embodiment shown in FIG. 10.
Figure 12:
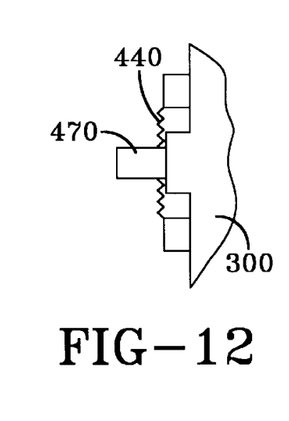
FIG. 12 is a cross sectional view of the connection between the vehicle sensor inner and outer housings as disclosed in FIG. 10.
Figure 13:
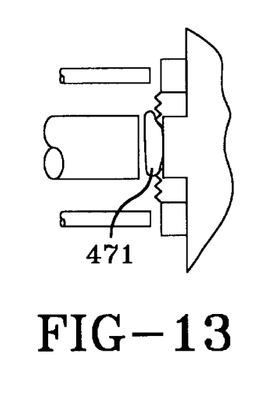
FIG. 13 is a cross sectional view of the connection between the vehicle sensor inner and outer housing after the connection has been made permanent.

FIGS. 10 and 11 disclose a further embodiment with the inner vehicle sensor housing assembly positioned manually or automatically on the vehicle sensor outer housing via a pin and slot method. The inner vehicle sensor housing 300 has two extending pieces on either side of the housing either directly parallel to each other or adjacent. Both sides of the housing 300 contain a vertical slot 460 through which the pin 470 from the outer vehicle sensor housing extends. Surrounding the slots are serrations 440 as shown in FIG. 11. Upon positioning the inner vehicle sensor housing via the slots and the outer vehicle sensor housing pins 470 the manufacturing operator will be able to adjust the position of the inner housing vertically until the vehicle sensor lever is positioned at the correct distance from the spool teeth (not shown. Once the correct position is located (as in FIG. 12) the pins 470 on the outer vehicle sensor housing are deformed by, for example, heat treatment, pressure being applied to the pins or an ultrasonic method, forcing the pin head 471 to crush and press against the serrations 440 surrounding the slot 460. This secures the inner vehicle sensor housing to the outer vehicle sensor housing. FIG. 13 shows the pin deforming via a deforming element such as a heat gun or simply by pressure exerted onto the head of the pin. The deformed pin head 471 is pressed into the serrations 440 deforming the serrations and securing the pin head to the inner vehicle sensor housing 300.

Figure 14:
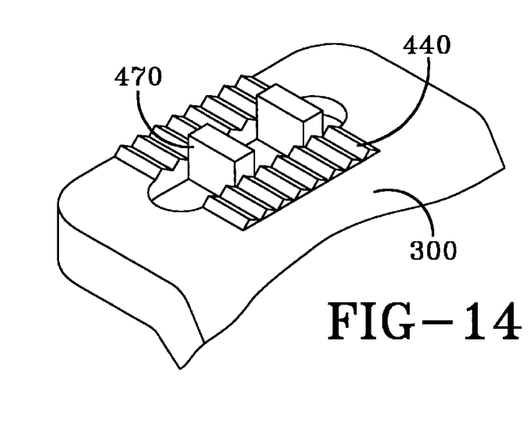
FIG. 14 is a fragmentary perspective view of a further embodiment of the present invention and the connection between the vehicle sensor inner and outer housing as discussed in FIG. 10 prior to the connection being made permanent.

FIG. 14 shows variations of this embodiment. there could be a number of pins 470 to provide a more secure method of connection and the pins 470 could be molded with a head which was deformed in some manner prior to securing the connection thus allowing less force to be required upon the pin head 471 when deforming to secured the connection permanently.

Figure 15:
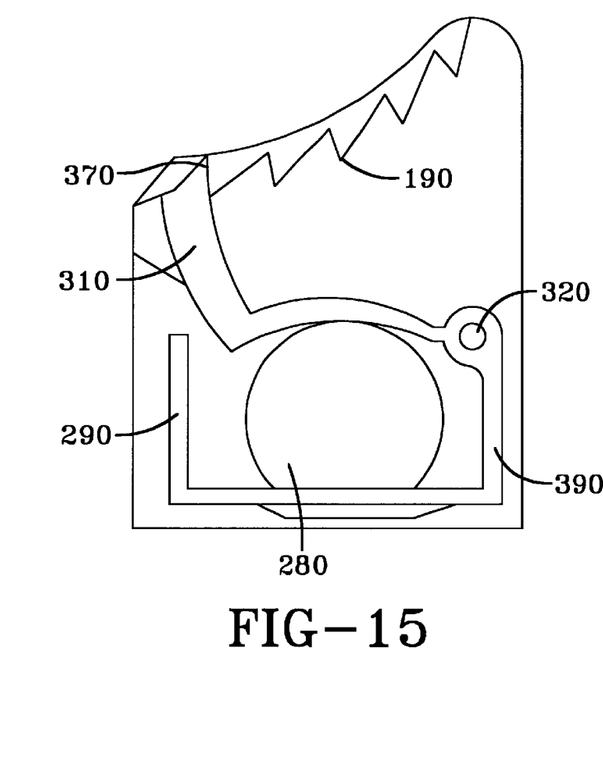
FIG. 15 is a fragmentary cross sectional view of a further embodiment of the present invention with the vehicle sensor inner housing and the spool teeth.
Figure 16:
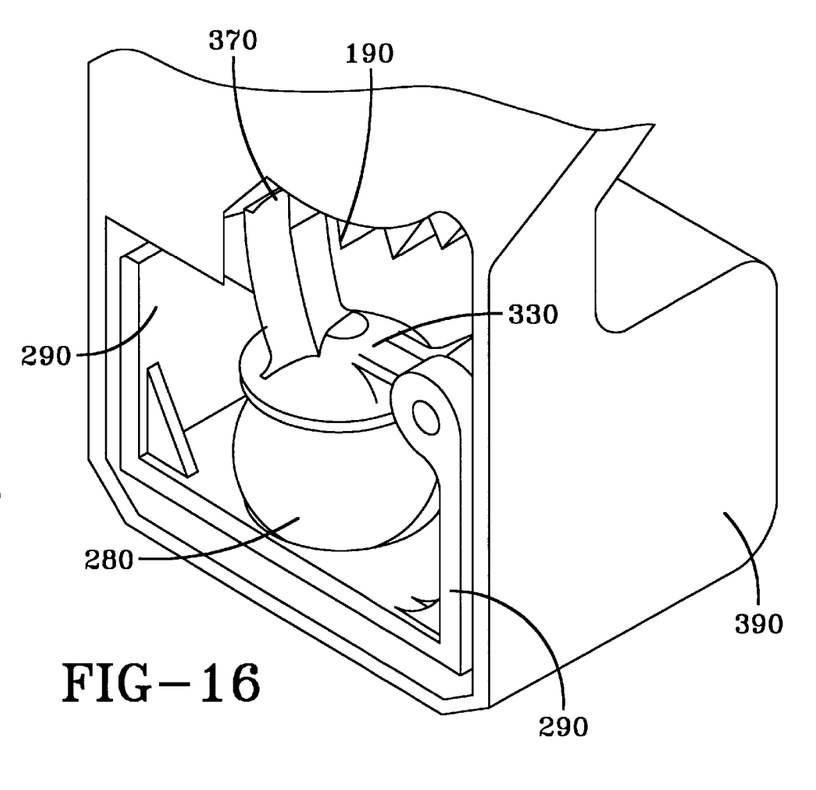
FIG. 16 is a fragmentary perspective view of the embodiment disclosed in FIG. 16 with the vehicle sensor inner and outer housings shown and the spool teeth depicted.

FIGS. 15 and 16 disclose a method of continually allowing the vehicle sensor lever tooth to engage with the spool teeth without adjusting the vehicle sensor housing or vehicle sensor lever's position. The vehicle sensor lever 310 pivots about a pivot hinge point 320 that is connected to the inner vehicle sensor housing 290. The vehicle sensor lever 310 is not rigid and can flex to a certain angle upon engagement with the spool teeth 190. As the vehicle sensor lever 310 is elastically bendable it is capable of engaging with the spool teeth 190 when required. The inner vehicle sensor housing is static thus allowing the vehicle sensor to swing into position around the pivot point 320 upon movement of the inertial mass 280. Thus the tip gap is automatically adjustable as the vehicle sensor lever 310 flexes to engage the vehicle sensor locking tooth 370 with the spool teeth 190 at the correct point on the spool teeth.

It is understood that the invention is not limited to the particular construction and arrangement of parts herein illustrated and described, but embraces such modified forms thereof as come within the scope of the following claims.

We claim:

1. A seat belt retractor comprising a frame, a spool rotatably mounted to the frame, a vehicle sensor lever for locking the spool to prevent rotation thereof, a vehicle sensor for detecting changes in vehicle acceleration or deceleration comprising inertial ball mass, an inner vehicle sensor housing, and an outer vehicle sensor housing, the inertial ball mass being arranged to move from an initial position to an actuating position to actuate the vehicle sensor lever into engagement with teeth on the spool, and an adjustment mechanism for adjusting the distance between the vehicle sensor lever and the teeth on the spool by adjusting the position of the inner vehicle sensor housing relative to the outer vehicle sensor housing, the inertial ball mass and the vehicle sensor lever connect directly with the inner vehicle sensor housing whereby the inertial ball mass and the vehicle sensor lever are adjusted with the inner vehicle sensor housing by the adjustment mechanism, the inner vehicle sensor housing and outer vehicle sensor housing engage with each other by serrations on one of the inner vehicle sensor housing or outer vehicle sensor housing, the serrations being deformable when placed in contact with the other of the inner vehicle sensor housing or outer vehicle sensor housing, the inner vehicle sensor housing and the outer vehicle sensor housing are secured to each other by the deformation of the serrations.

2. The seat belt retractor of claim 1 wherein serrations are provided on both the inner vehicle sensor housing and the outer vehicle sensor housing allowing the inner vehicle sensor housing and outer vehicle sensor housing to engage together.

3. The seat belt retractor of claim 1 wherein the inner vehicle sensor housing is secured to the outer vehicle sensor housing by inserting the pin from the outer vehicle sensor housing into a slot from the inner vehicle sensor housing, the pin being deformable so as to secure permanently the inner vehicle sensor housing in the desired position.

4. The seat belt retractor of claim 3 wherein the inner vehicle sensor housing has serrations and a slot for receiving the pin, the pin extending through the slot in the outer vehicle sensor housing so as to force the serrations against the outer vehicle sensor housing whereby the serrations deform to secure the inner vehicle sensor housing to the outer vehicle sensor housing.

5. The seat belt retractor of claim 4 wherein two or more such pins are provided.

6. The seat belt retractor of claim 1 in which the inner vehicle sensor housing has an arm extending therefrom, the arm having a slot with serrations arranged adjacent the slot, the outer vehicle sensor housing having a rivet extending therefrom and arranged in a slot in the arm on the inner vehicle sensor housing, the rivet being deformable against the serrations so as to secure the outer vehicle sensor housing to the inner vehicle sensor housing.

\* \* \* \* \*